United States Patent
Nicolson

(10) Patent No.: US 12,460,409 B2
(45) Date of Patent: Nov. 4, 2025

(54) LIGHTWEIGHT BLOCKS WITH STONE-LIKE APPEARANCE

(71) Applicant: TUSCAN STONEWORX USA, LLC, Lindon, UT (US)

(72) Inventor: David L. Nicolson, Lindon, UT (US)

(73) Assignee: TUSCAN STONEWORX USA, LLC, Lindon, UT (US)

( * ) Notice: Subject to any disclaimer, the term of this patent is extended or adjusted under 35 U.S.C. 154(b) by 0 days.

(21) Appl. No.: 18/427,077

(22) Filed: Jan. 30, 2024

(65) Prior Publication Data

US 2024/0167270 A1  May 23, 2024

Related U.S. Application Data

(62) Division of application No. 17/198,642, filed on Mar. 11, 2021, now Pat. No. 11,970,853.

(Continued)

(51) Int. Cl.
| | |
|---|---|
| *E04B 2/02* | (2006.01) |
| *B28B 19/00* | (2006.01) |
| *C04B 14/04* | (2006.01) |
| *C04B 14/28* | (2006.01) |
| *C04B 41/00* | (2006.01) |

(Continued)

(52) U.S. Cl.
CPC ............ *E04B 2/02* (2013.01); *B28B 19/0053* (2013.01); *C04B 14/04* (2013.01); *C04B 14/28* (2013.01); *C04B 41/009* (2013.01); *C04B 41/5076* (2013.01); *C04B 41/53* (2013.01); *C04B 2111/00482* (2013.01); *C04B 2111/00508* (2013.01); *E04B 2002/0269* (2013.01); *E04B 2002/0286* (2013.01); *E04B 2/8611* (2013.01)

(58) Field of Classification Search
CPC ....... C04B 41/65; C04B 41/63; C04B 41/009; C04B 41/5076; C04B 41/53; C04B 2111/00508; C04B 2111/40; C04B 2111/54; C04B 2111/802; C04B 41/48; C04B 41/5079; E04C 1/40; E04C 1/00; E04B 2/02; E04B 2002/0269; E04B 2002/0286; E04B 2/8611; E04B 2002/8682; B28B 19/0053
USPC ......... 52/596, 311.1, 309.4, 309.17
See application file for complete search history.

(56) References Cited

U.S. PATENT DOCUMENTS 2,629,135 A * 2/1953 Johnson ............ B28B 7/36
425/117
2,751,775 A  6/1956 Sergovic
(Continued)

*Primary Examiner* — Brent W Herring
(74) *Attorney, Agent, or Firm* — Workman Nydegger

(57) ABSTRACT

The present disclosure describes modular blocks configured to give the appearance of natural or cut stone. An aesthetic coating composition may be applied to one or more surfaces of a block having a low-density, such as an insulating concrete form (ICF), to form an modular block having the appearance of cut stone. The aesthetic coating composition includes a binder component, such as a cementitious binder made from white Portland cement, or a polymer binder such as an acrylic binder, an aggregate component, such as a limestone aggregate component, and optionally an adhesive component. The aggregate component includes a fine sand portion and a coarse sand portion that effectively enable the appearance of cut stone after finishing of the aesthetic coating surface via sanding, polishing, sandblasting, acid etching, acid finishing, or exposed aggregate finishing.

20 Claims, 11 Drawing Sheets

Related U.S. Application Data

(60) Provisional application No. 63/041,088, filed on Jun. 18, 2020.

(51) Int. Cl.

| | | |
|---|---|---|
| *C04B 41/50* | (2006.01) | |
| *C04B 41/53* | (2006.01) | |
| C04B 111/00 | (2006.01) | |
| E04B 2/86 | (2006.01) | |

(56) References Cited

U.S. PATENT DOCUMENTS

| | | | |
|---|---|---|---|
| 2,805,448 A * | 9/1957 | Rubenstein | E04C 1/40 |
| | | | 174/521 |
| 2,850,890 A * | 9/1958 | Rubenstein | B28B 11/04 |
| | | | 264/261 |
| 2,951,001 A | 8/1960 | Rubenstein | |
| 3,030,234 A | 4/1962 | Mcclinton | |
| 3,449,880 A | 6/1969 | Bailey, Jr. | |
| 3,629,384 A | 12/1971 | Magnus | |
| 3,660,214 A | 5/1972 | Nichols et al. | |
| 3,809,595 A | 5/1974 | Nichols et al. | |
| 3,853,577 A * | 12/1974 | Nishida | C04B 41/4505 |
| | | | 524/4 |
| 4,172,752 A | 10/1979 | Robbins | |
| 4,349,398 A * | 9/1982 | Kearns | E04D 7/00 |
| | | | 427/403 |
| 4,349,588 A | 9/1982 | Schiffer | |
| 4,831,802 A | 5/1989 | Cromrich et al. | |
| 4,963,305 A * | 10/1990 | Cromrich | E04C 1/40 |
| | | | 264/43 |
| 5,634,307 A * | 6/1997 | Larriberot | E04F 13/147 |
| | | | 52/316 |
| 5,787,667 A * | 8/1998 | Sheahan | E06B 1/24 |
| | | | 52/211 |
| 5,896,714 A * | 4/1999 | Cymbala | E04B 2/8641 |
| | | | 52/568 |
| 5,913,791 A | 6/1999 | Baldwin | |
| 5,930,964 A * | 8/1999 | Boehning | E04C 1/41 |
| | | | 52/375 |
| 5,960,604 A | 10/1999 | Blanton | |
| 6,360,505 B1 * | 3/2002 | Johns | E04F 13/147 |
| | | | 52/311.1 |
| 6,397,549 B1 * | 6/2002 | Baldwin | E04C 1/40 |
| | | | 52/607 |
| RE38,364 E * | 12/2003 | Wetherell | E04F 21/24 |
| | | | 451/60 |
| 6,770,328 B1 | 8/2004 | Whaley | |
| 9,038,346 B1 | 5/2015 | Wauhop | |
| 10,161,132 B1 | 12/2018 | Maslehuddin et al. | |
| 11,325,279 B2 * | 5/2022 | Nielsen | B44F 9/04 |
| 11,707,863 B2 * | 7/2023 | Nielsen | B44F 9/04 |
| | | | 264/314 |
| 11,834,372 B1 * | 12/2023 | El-Hassan | B01J 20/28066 |
| 2004/0006943 A1 | 1/2004 | Weick | |
| 2007/0044685 A1 | 3/2007 | Khanna | |
| 2007/0218314 A1 * | 9/2007 | Anderson | E04D 13/002 |
| | | | 264/333 |
| 2011/0072753 A1 | 3/2011 | Macdonald | |
| 2020/0198181 A1 * | 6/2020 | Nielsen | C04B 28/04 |
| 2022/0064068 A1 * | 3/2022 | Denton | C04B 41/5022 |
| 2022/0227022 A1 * | 7/2022 | Nielsen | B05D 1/02 |
| 2023/0364825 A1 * | 11/2023 | Nielson | E04C 1/40 |

* cited by examiner

LIGHTWEIGHT BLOCKS WITH STONE-LIKE APPEARANCE

CROSS-REFERENCE TO RELATED APPLICATIONS

This Application is a division of U.S. patent application Ser. No. 17/198,642, filed Mar. 11, 2021, now U.S. Pat. No. 11,970,853, which claims the benefit of U.S. Provisional Application No. 63/041,088, filed Jun. 18, 2020, which are incorporated by reference in their entirety

BACKGROUND

Building structures such as walls and fences are often built by organizing several individual masonry units into the structure. The masonry units may be pieces of cut stone, such as marble, granite, travertine, sandstone, or limestone. Frequently, masonry units are some form of brick. Bricks are typically laid together in an alternating pattern of offset courses and joined together using mortar. The relatively smaller bricks often seen in residential applications are typically made of clay combined with sand or other type of aggregate and usually fired to provide suitable strength.

Concrete is also utilized to form masonry units. Masonry units formed from concrete are often referred to as cinder blocks, breeze blocks, hollow blocks, construction blocks, clinker blocks, and Besser blocks. The terms "concrete blocks" and "concrete masonry unit" (CMU) are often used to generally refer to all such varieties. Concrete blocks are made from cast concrete, which typically includes Portland cement and a suitable aggregate material. Lower cost concrete blocks often use industrial wastes such as low-quality fly ash or bottom ash as at least part of the aggregate. This is why such blocks are commonly referred to as "cinder blocks" in the United States.

Concrete blocks are useful, low cost building units and are particularly beneficial for forming walls of buildings. Concrete blocks can be utilized for structural and/or architectural purposes. When properly reinforced, CMUs can support structural loads. Despite these benefits, concrete blocks are typically considered to be unsightly or too "industrial" for many residential or business environments. They are most often used for utilitarian purposes of low esthetic value.

Furthermore, concrete blocks are a relatively heavy building material, having a density of about 2000 kg/m$^3$ or more, requiring significant time and labor for construction. Concrete blocks are typically rigid and can develop cracks over time. Concrete blocks can permit significant heat loss, resulting in high energy costs for heating and cooling residential and commercial structures.

Insulating concrete forms (ICFs) have emerged as an energy and cost-efficient alternative to cinderblocks and concrete walls. Generally, ICFs comprise a rigid insulating layer forming exterior and/or interior wall substrates. The forms can comprise modular interlocking units that can be stacked, reinforced, and backfilled with concrete to form structural walls or floors of a building. Once locked in place, the interior space between inner and outer walls of the ICFs is filled with concrete. Reinforcing steel bars ("rebar") can be placed inside of the ICFs before concrete is poured to give the concrete increased tensile and flexural strength.

ICFs are increasingly used to satisfy energy-efficient building codes and natural disaster resistant building codes. ICFs may also provide additional building enhancements including soundproofing, space to run electrical and plumbing, backing for finishes, improved indoor air quality and climate control.

However, ICFs, similar to concrete and cinderblocks, lack aesthetic appeal and incur additional costs in labor and materials in order to apply aesthetic coverings. Many preferred coverings may include high-quality stone or brick, which can be costly and are labor-intensive to install.

BRIEF SUMMARY

Disclosed herein are lightweight blocks configured to give the appearance of cut stone and compositions and methods of manufacturing such lightweight blocks. Lightweight block substrates are typically made from a lightweight polymer, such as molded expanded polystyrene (EPS), polyurethane, and the like, and can have any desired shape. In some embodiments, the lightweight block substrate can have a shape similar to conventional CMUs, bricks, or other building blocks. In one embodiment, the lightweight block substrate can be an insulated concrete form (ICF). Lightweight blocks can include at least one surface having or treated with a plaster, stucco, or other aesthetic coating composition formulated to give the appearance of cut stone.

Lightweight block substrates typically comprise a lightweight material having a density less than 1680 kg/m$^3$, such as less than about 1500 kg/m$^3$, or less than about 1250 kg/m$^3$, or less than about 1000 kg/m$^3$, or less than about 750 kg/m$^3$, or less than about 500 kg/m$^3$, or less than about 300 kg/m$^3$, or less than about 200 kg/m$^3$, or less than about 150 kg/m$^3$, or less than about 100 kg/m$^3$, or less than about 80 kg/m$^3$, or less than about 60 kg/m$^3$.

In some embodiments, the aesthetic coating composition includes a binder component and an aggregate component. The binder component may include a cementitious binder that includes Portland cement, such as white cement or grey cement, alone or in combination with one or more supplementary cementitious materials (SCMs), such as fly ash, metakaolin, pumice, natural pozzolan, slag, or silica fume. Alternatively, or in addition to the cementitious binder, the binder component may comprise a polymer binder, such as an acrylic binder that includes an acrylic resin and/or polymer. Other polymer binders include, but are not limited to, polyvinyl alcohol (PVA), alkyd resins, polyurethane, and other materials typically used to paint, seal or protect a wall surface.

In some embodiments, the aggregate component can be one or more limestone aggregates, one or more silica aggregates, or a combination of limestone and silica aggregates of same or different size. In some embodiments, at least two gradations (or sizes) of aggregates can be used, such as two differently sized limestone aggregates, two differently sized silica aggregates, or a combination of differently sized limestone and silica aggregates.

In some embodiments, the aggregate component may include a fine sand portion and a coarse sand portion. The fine sand portion, which may be considered to be a filler and not an SCM, may have, for example, a D90 within a range of about 0.075 mm to 0.425 mm, or about 0.105 mm to 0.300 mm, or about 0.150 mm to 0.212 mm, and a D50 of 0.075 mm or less. The coarse sand portion may have, for example, a D90 within a range of about 0.425 mm to 2.80 mm, or about 0.60 mm to 1.70 mm, a D50 within a range of about 0.212 mm to 0.60 mm, or about 0.300 mm to 0.425 mm, and a D10 within a range of about 0.075 mm to 0.212 mm, or about 0.105 mm to 0.150 mm.

The use of two separate gradations of aggregates improves rheology and beneficially provides the appearance of natural or cut stone after the aesthetic coating composition has cured and finished. With respect to rheology, the fine sand portion can provide workability, cohesiveness, and texture to the aesthetic coating composition. With respect to aesthetic look, exposed grains of the coarse sand portion can provide the appearance of distributed crystal facets to the finished surface of the coating. The resulting appearance beneficially resembles that of natural or cut stone.

A method of manufacturing a lightweight block includes the steps of providing a lightweight block substrate and applying a plaster, stucco, or other aesthetic coating composition to at least one surface of the lightweight block substrate to form an intermediate block comprising the lightweight block substrate and one or more aesthetic coating layers. The formed plaster, stucco, or other aesthetic coating layer may then be leveled by moving the intermediate block past a leveler, or vice versa, such as at least one of a leveling blade or roller. Then, the plaster, stucco, or other aesthetic coating composition layer may be allowed to harden or cure.

Following sufficient hardening or curing of the aesthetic coating layer, the aesthetic coating layer may be finished using one or more finishing processes to provide a desired finish. Examples include sanding, polishing, sandblasting, acid etching, acid finishing, exposed sand grain finishing using a face retarder and power washer, and sealing. At least some finishing processes beneficially abrade the coarse sand portion of the aesthetic coating to form and/or expose the crystal facets that resemble those of cut stone. A polymer or other sealant can be applied to the finished surface to seal, waterproof, and/or protect the aesthetic coating layer.

Also disclosed herein are systems for manufacturing lightweight blocks having the appearance of cut stone. In one embodiment, a system for manufacturing lightweight blocks includes a conveyance system configured to convey one or more lightweight block substrates past a series of modifying machines. The modifying machines include: an applicator configured to apply a plaster, stucco, or other aesthetic coating composition to at least one surface of the lightweight block substrate to form an intermediate aesthetic coating layer; a leveler configured to slough off or remove excess plaster, stucco, or other aesthetic coating composition from an outer surface of the intermediate aesthetic coating layer; and one or more finishers, such as one or more of a sander, polisher, sandblaster, applicator for acid etch, applicator for acid wash, applicator for face retarder, and power washer configured to alter the surface of the plaster layer. The system may additionally include one or more of: a holding section for allowing the intermediate aesthetic coating layer to harden or cure prior to finishing; a cleaner configured to remove residual debris after finishing; and a sealer configured to apply a sealant to the surface of the aesthetic coating layer.

Additional features and advantages will be set forth in part in the description that follows, and in part will be obvious from the description, or may be learned by practice of the embodiments disclosed herein. It is to be understood that both the foregoing brief summary and the following detailed description are exemplary and explanatory only and are not restrictive of the embodiments disclosed herein or as claimed.

BRIEF DESCRIPTION OF DRAWINGS

In order to describe the manner in which the above-recited and other advantages and features can be obtained, a more particular description of various embodiments will be rendered by reference to the appended drawings. Understanding that these drawings depict only sample embodiments and are not, therefore, to be considered to be limiting of the scope of the invention, the embodiments will be described and explained with additional specificity and detail through the use of the accompanying drawings, in which.

DETAILED DESCRIPTION

Disclosed herein are lightweight blocks configured to give the appearance of cut stone and compositions and methods of manufacturing such lightweight blocks. Lightweight blocks include lightweight block substrate and at least one surface having or treated with a plaster, stucco, or other aesthetic coating composition formulated to give the appearance of natural or cut stone.

I. Lightweight Blocks

Lightweight blocks include lightweight insulating concrete forms or other lightweight block substrates that have been modified by applying a plaster, stucco, or other aesthetic coating composition to at least one surface of the lightweight block substrate. The lightweight block substrate comprises a lightweight material, such as lightweight foam concrete, lightweight foam ceramic, expanded polystyrene (EPS), extruded polystyrene foam (XPS), polyurethane foam, cement-bonded wood fiber, cement-bonded polystyrene beads, cellular concrete, or similar materials having a density of less than 1680 kg/m$^3$.

In some embodiments, the lightweight block substrate comprises a lightweight material having a density less than about 1500 kg/m$^3$, or less than about 1250 kg/m$^3$, or less than about 1000 kg/m$^3$, or less than about 750 kg/m$^3$, or less than about 500 kg/m$^3$, or less than about 300 kg/m$^3$, or less than about 200 kg/m³, or less than about 150 kg/m³, or less than about 100 kg/m³, or less than about 80 kg/m³, or less than about 60 kg/m³.

For simplicity, the following description will use the terms "substrate" or "block substrate" to refer generally to substrates (e.g., structural or non-structural) having a surface that can be coated with a plaster material.

Particularly preferred embodiments utilize expanded polystyrene (EPS) foam as the lightweight block substrate material, though it will be understood that the embodiments described herein are not limited to EPS foam.

The plaster, stucco, or other aesthetic coating composition is formulated to provide a beneficial aesthetic and/or structural appearance to the treated surface of at least one side of a lightweight block. The aesthetic coating composition may, for example, provide the appearance of natural or cut stone. The lightweight block can therefore be utilized in architectural and/or decorative applications with less expense and with greater design freedom as compared to natural or cut stone.

Figure 1:
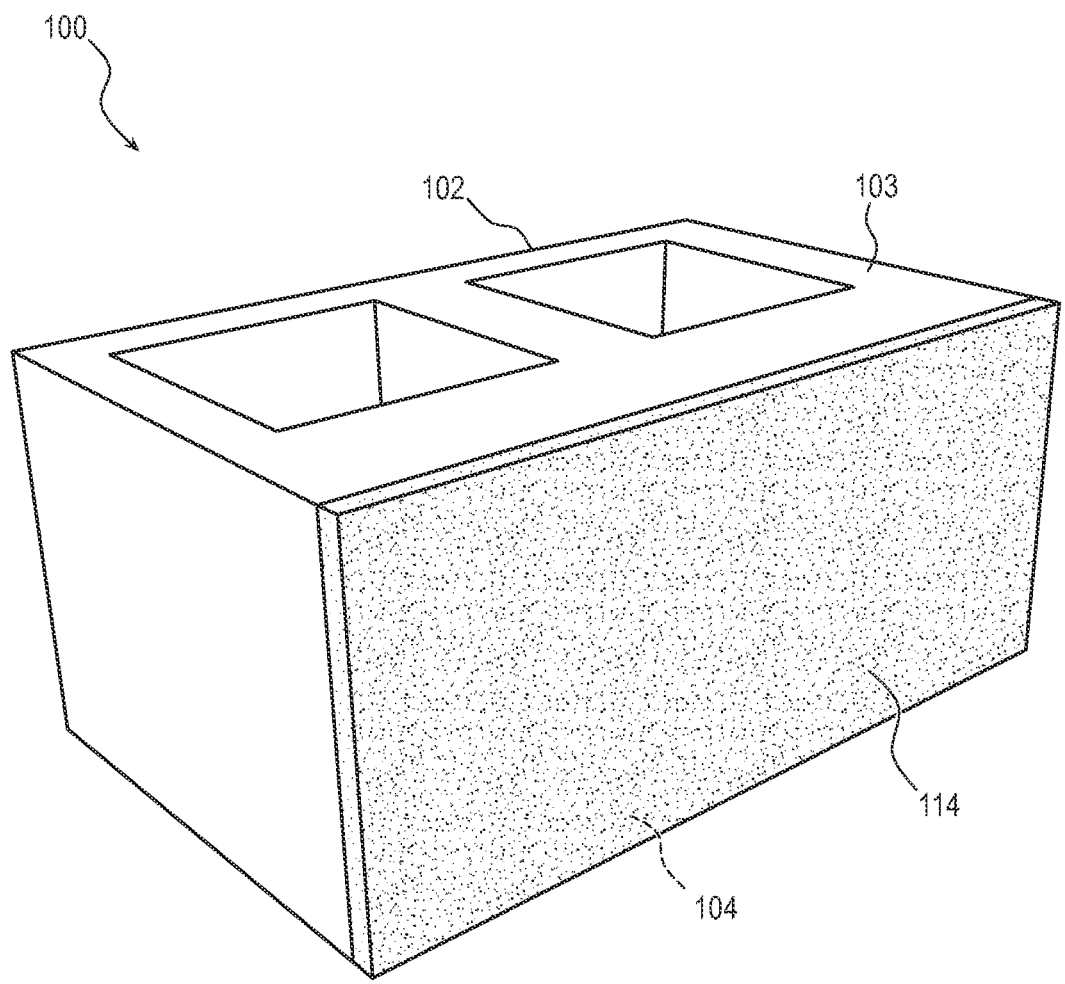
FIG. 1 illustrates an exemplary lightweight block including a substrate surface that has been formed or treated with a plaster, stucco, or other aesthetic coating composition formulated for providing an aesthetic surface, such as to give the appearance of natural or cut stone.

FIG. 1 is an isometric view of an exemplary lightweight block 100 including a lightweight block substrate 103 having first and second sides 102, 104 and an aesthetic coating layer 114 on at least one side. The cuboid shape (e.g., a three-dimensional rectangular prism) of lightweight block 100 illustrated in FIG. 1 can be the same as or similar to typical blocks (e.g., CMU blocks) known in the art, though other embodiments may be shaped differently so long as they may be arranged with other blocks to form a building structure. For example, other embodiments of a lightweight block may have a cube shape, a trapezoidal prism shape, a panel/tile shape, a shape with a polygonal cross-section, or a shape with one or more curved surfaces. Additionally, or alternatively, some embodiments may include corners and/or edges that are rounded, beveled, chamfered, and the like.

In some embodiments, only a single side of the lightweight block substrate includes or is treated with a plaster, stucco, or other aesthetic coating composition to form an aesthetic coating layer. Once multiple blocks have been arranged to form a building structure, the aesthetic coating layer is usually the only surface that is visible. In some cases, grooves or recesses may be provided to receive grout, which can complete the finished appearance of layered stone. However, other surfaces may also be treated according to the needs of a particular application. For example, corner and end pieces may have two or more exposed surfaces following formation of the building structure. In some cases, opposing surfaces may remain visible after construction, such as where the lightweight blocks are used to form a partition wall that remains visible from either side of the wall following construction. In such cases, both surfaces of the lightweight block substrate may be treated to have an aesthetic coating layer.

Figure 5:
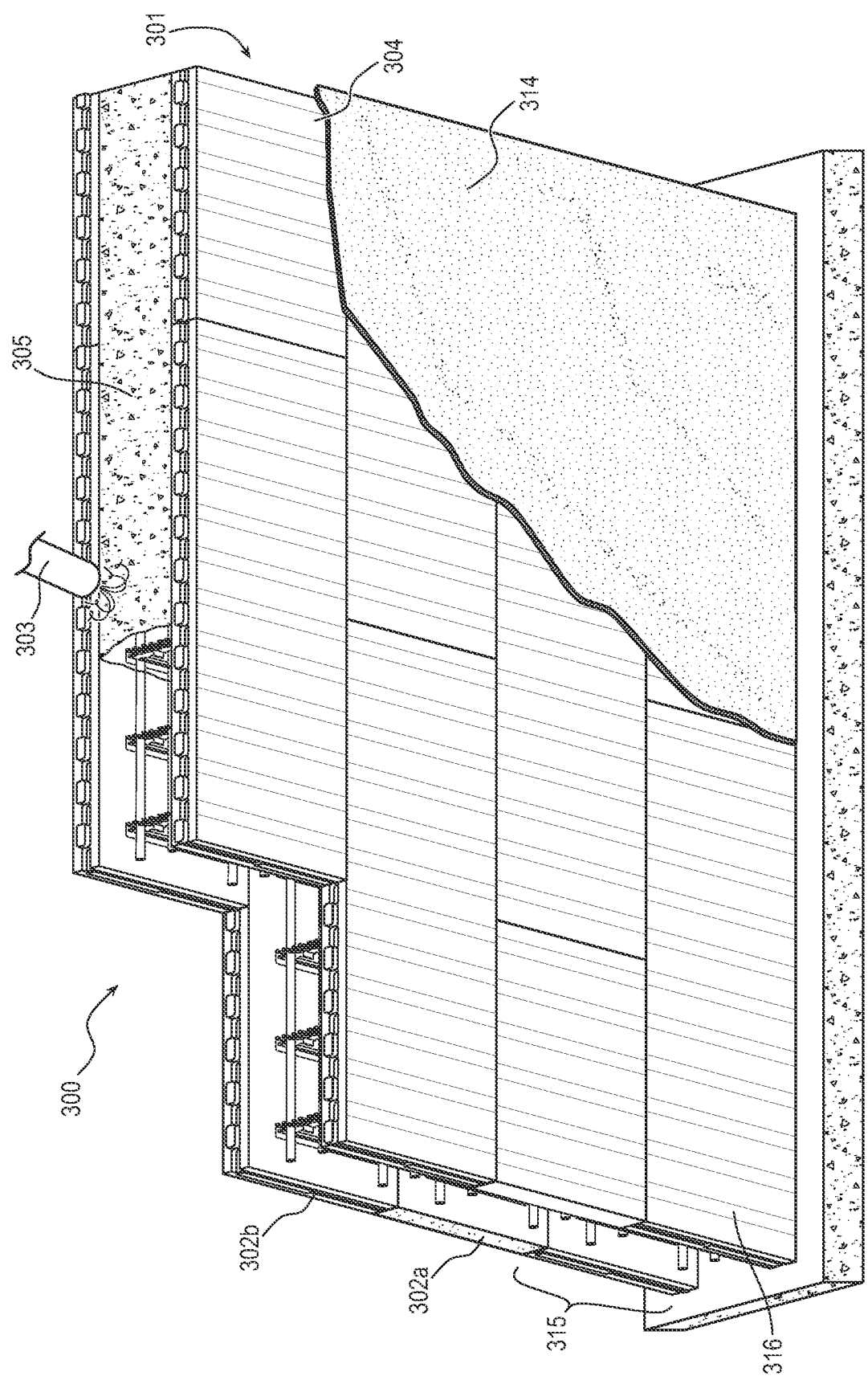
FIG. 5 illustrates an exemplary wall being formed by applying an aesthetic coating applied to the surface of insulated concrete form (ICF) blocks.

Another example of a lightweight block 300 includes an insulating concrete form (ICF) as the block substrate (see FIG. 5, 6A-6B), which can modified to include a an aesthetic coating layer 314 similar to aesthetic coating layer 114 on a side of lightweight block 100 of FIG. 1. Accordingly, a similar process can be used to form the aesthetic coating layer 114 on a surface of lightweight block 300.

Lightweight block 300 can be stackable such that multiple lightweight blocks 300 can be stacked in a number of configurations in order to form a wall 301. For example, the lightweight blocks can be straight blocks (see FIGS. 5-6B), corner blocks (not shown), T blocks (not shown), curved blocks (not shown), angled blocks (not shown), and the like.

Lightweight blocks 300 can be modular and have interlocking features, providing for stabilization of the blocks during assembly to form a wall form. For example, in one embodiment, a top surface 306a of a first lightweight block 300 can include a series of alternating depressions 307 and protuberances 308 which can mate with corresponding depressions and protuberances on a bottom surface 306b of a second lightweight block 300 when the second lightweight block 300 is placed on top of the first lightweight block 300.

Figure 6A:
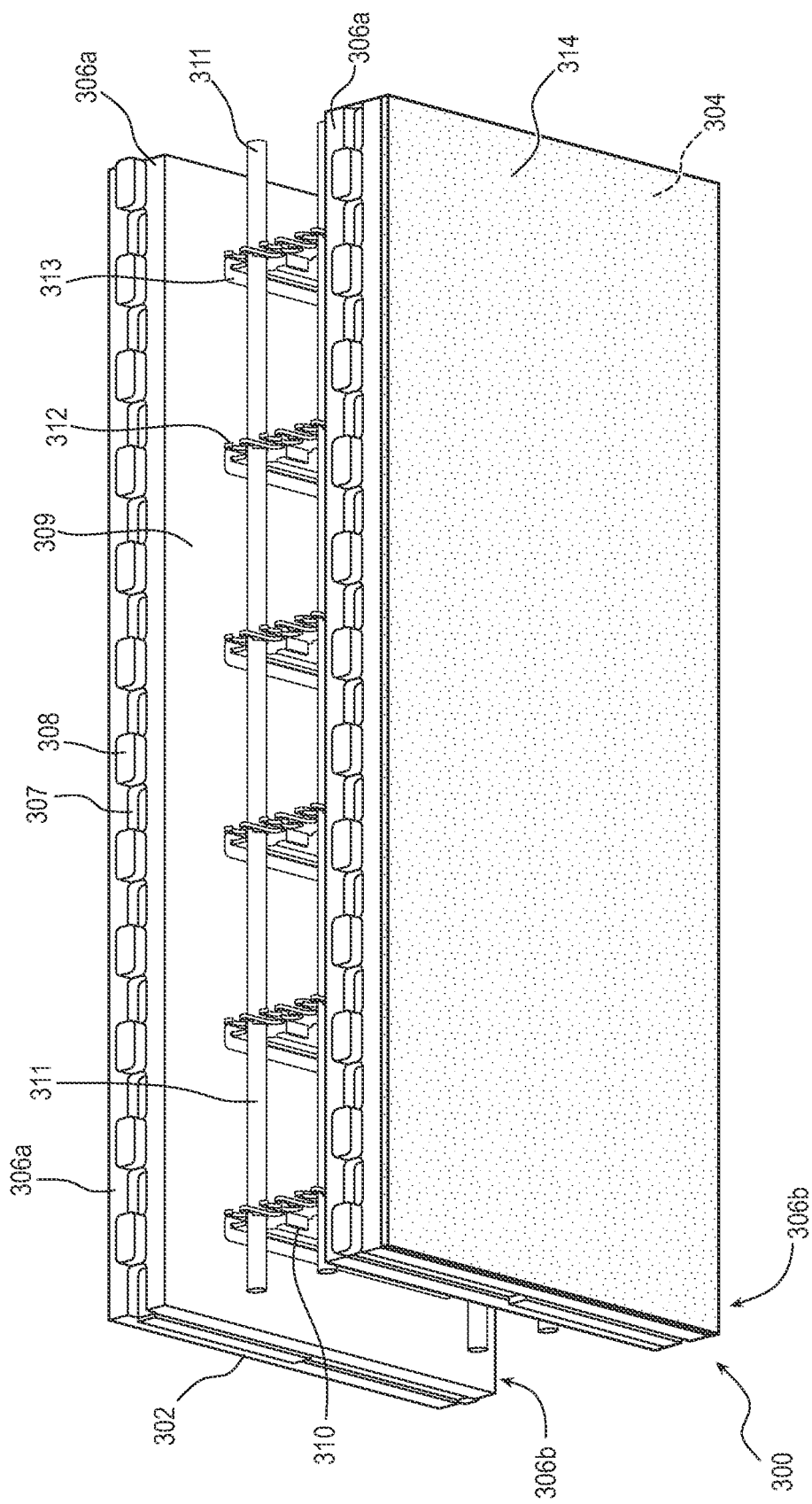
FIG. 6A is a perspective view of an exemplary lightweight block formed using an ICF as the lightweight block substrate and including an aesthetic coating.
Figure 6B:
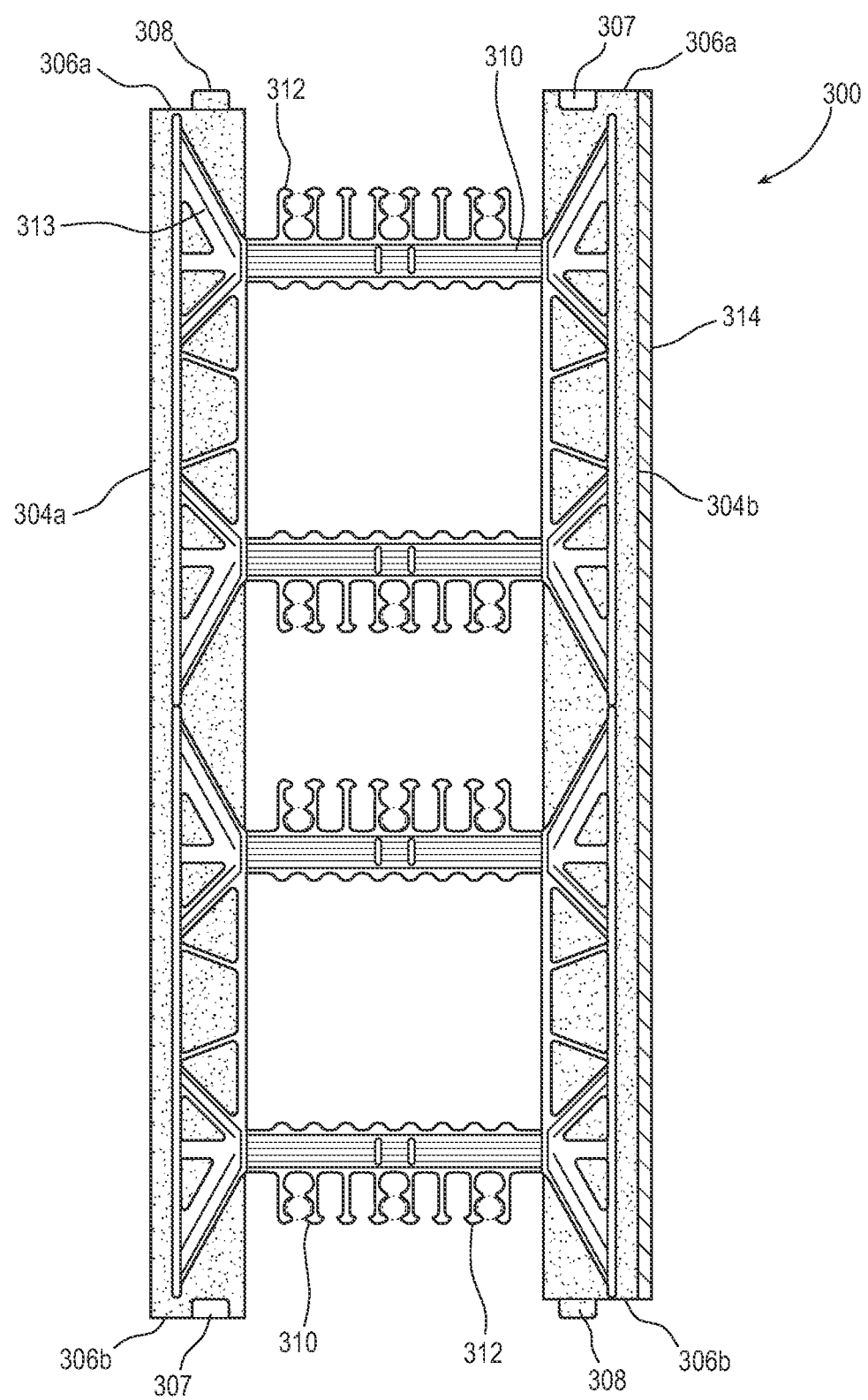
FIG. 6B illustrates a cross-sectional view of the lightweight block of FIG. 6A.

As shown in FIG. 6B, the bottom edge 306b and top edge 306a of a side 304 can have inverse interlocking features. In FIG. 6B for example, a lightweight block 300 includes a first side 304a and a second side 304b, which are joined by a series of supports 310. A top surface 306a of the first side 304a has a depression 307, and an opposing bottom surface 306b of the same side has a protuberance 308. As discussed above, the alternating series of protuberances 308 and depressions 307 along the top surface 306a and bottom surface 306b can be positioned along the length of the lightweight block 300.

The second side 304b can have an alternating series of depressions 307 and protuberances 308, though the alternating pattern of the top surface 306a and bottom surface 306b of the second side 304b, can be "opposite" of the first side 304a. For example, in the cross-sectional view shown in FIG. 6B, the top surface 306a of the first side 304a has a depression 307, while the top surface 306a of the second side 304b has a protuberance 308. This opposite or staggered patterning of the first side 304a relative to the second side 304b allows for the lightweight blocks 300 to be modular forms that can be assembled (e.g., stacked) in a staggered manner (see e.g., FIGS. 5, 11A-11B) to avoid long vertical seams, which can weaken the final structure.

The lightweight blocks 300 can further include a series of supports 310, which include one or more fastening ends 313 integrally formed within the block substrate of sides 304a, 304b. In some embodiments (see e.g., FIGS. 13A and 13B), only one side 404 is molded onto or integrally formed with the support 410, such as for example, when the modular block comprises one side 404 comprising a polymer substrate material and a temporary form 409 (e.g., wood).

As illustrated in FIGS. 6A and 6B, supports 310 can have a number of prongs 312 configured to receive reinforcement bars 311 ("rebar"). Once a first row 315 (see FIG. 5) of modular lightweight blocks 300 are arranged end-to-end, rebar 311 can be positioned within the prongs 312. A second row of modular lightweight blocks 300 can then be arranged on top of the first row 315. Once the rows of modular lightweight blocks 300 have been stacked to a desired height, a pump hose 303 can be used to pump a filler substrate 305 such as, for example, concrete, interior bonding concrete, grout, mortar, or the like, into the space between the sides 304a, 304b of the modular lightweight blocks 300.

One or more sides 304 of the lightweight modular block substrate can have a textured exterior 316 to promote the bonding of an aesthetic coating (e.g. plaster or stucco composition 314) to a side 304 of the lightweight block 300. The one or more sides 304 (304a, 304b) can be formed of a low-density substrate. The low-density substrate may comprise lightweight foam concrete, lightweight foam ceramic, expanded polystyrene (EPS), extruded polystyrene foam (XPS), polyurethane foam, cement-bonded wood fiber, cement-bonded polystyrene beads, cellular concrete, or similar materials.

As explained in greater detail below, the plaster, stucco, or other aesthetic coating composition is formulated to provide an aesthetic appearance resembling that of natural or cut stone. The base block materials (i.e., block substrates) and the manufacturing methods used to form the lightweight blocks provide a less expensive and/or lower weight alternative to natural or cut stone. Further, using natural or cut stone may involve difficulties in finding a proper supply of stone. In other words, the use of natural stone may require an extensive search for a proper supply that meets size and/or composition and/or aesthetic requirements. On the other hand, the lightweight block products described herein are capable of controlled manufacture according to particular project requirements and can have an almost endless variety of colors and/or textures resembling stone or having a desired look.

Because the lightweight blocks are made using a lightweight block substrate, they will typically have a weight that is significantly less than a similarly size piece of natural or cut stone. Lightweight blocks can therefore provide aesthetic benefits of natural or cut stone while reducing limitations associated with cost, weight, and/or supply of stone.

II. Aesthetic Coating Compositions

The plaster, stucco, or other aesthetic coating composition may be formulated to include: 1) a binder component, 2) an aggregate component, preferably including at least two types and/or gradations of aggregate (e.g., limestone and/or silica aggregates of different sizes), and optionally 3) an adhesive component. The aesthetic coating composition may be applied to a block substrate to form a decorative aesthetic coating layer, such as shown in FIG. 1.

The binder component preferably includes a cementitious binder, such as white Portland cement. Although some embodiments may include ordinary (grey) Portland cement, the cementitious binder component is preferably 50% or more, 60% or more, 75% or more, or 90% or more, or 95% or more, or about 100% white Portland cement. A supplementary cementitious material may optionally be included, examples of which include fly ash, ground granulated blast furnace slag (GGBFS), metakaolin, silica fume, pumice, ground glass, and natural pozzolan. The cementitious binder component may make up about 15% to 45%, or more preferably about 20% to 40% (e.g., about 25% to 35%) of the weight of the plaster composition (excluding water).

Examples of other cementitious binders include calcium aluminate cement (CAC), magnesium oxychloride cement, CSA cement (calcium sulphate aluminate cement), phosphate cement, silicate cement, geopolymer cement, and alkali-activated slags and pozzolans.

Alternatively, or in addition to the cementitious binder, the binder component may comprise a polymer binder, such as an acrylic binder that includes an acrylic resin and/or polymer. Other polymer binders include, but are not limited to, polyvinyl alcohol (PVA), alkyd resins, polyurethane, and other materials typically used to paint, seal or protect a wall surface.

The aggregate component may constitute about 55% to 85%, or more preferably about 60% to 80% (e.g., about 65% to 75%) of the weight of the aesthetic coating composition (excluding water). The aggregate component preferably includes at least two gradations. Beneficial results closely resembling the appearance of natural or cut stone have been shown when both a fine sand and a coarse sand are included in the aggregate component of the aesthetic coating composition.

The aggregate may include one or more gradations of limestone, one or more gradations of silica, or a combination thereof. Limestone is softer than silica and can be easier to sand. Silica may provide a more defined crystal structure and greater strength. An aggregate may include, for example, a fine limestone portion, and a coarse limestone and/or silica portion. Alternatively, nn aggregate may include a fine silica portion, and a coarse limestone and/or silica portion.

As used herein, the "fine" or "fine sand" portion of the aggregate is a sand having a D90 of about 0.425 mm or less (i.e., 90% or more of the material passes through a 40 mesh sieve), or about 0.300 mm or less (i.e., 90% or more of the material passes through a 50 mesh sieve) or even about 0.212 mm or less (i.e., 90% or more of the material passes through a 70 mesh sieve). For example, the D90 of the fine sand portion can be within a range of about 0.075 mm to 0.425 mm, or about 0.105 mm to 0.300 mm, or about 0.150 mm to 0.212 mm. The fine sand portion can also have a D50 that is about 0.075 mm or less (i.e., 50% or more of the material passes through a 200 mesh sieve). The fine sand can be considered to be a filler rather than an SCM.

As used herein, the "coarse" or "coarse sand" portion of the aggregate is a sand or other particle having a D90 of greater than about 0.425 mm (i.e., less than 90% of material passes through a 40 mesh sieve), or greater than about 0.60 mm (i.e., less than 90% of material passes through a 30 mesh sieve). For example, the D90 of the coarse sand portion may be within a range of about 0.425 mm to 2.80 mm, or about 0.60 mm to 1.70 mm. The coarse sand portion may have a D50 within a range of about 0.212 mm to 0.60 mm, or about 0.300 mm to 0.425 mm. In addition, the coarse sand portion may have a D10 within a range of about 0.075 mm to 0.212 mm, or about 0.105 mm to 0.150 mm.

Plaster, stucco, or other aesthetic coating compositions having aggregates with such fine and coarse sand portions have been found to effectively provide the appearance of natural or cut stone. The fine sand portion enables effective application of the aesthetic coating composition to the treated surface and facilitates even coverage of the treated surface. At the same time, the coarse sand portion provides visible crystal facets that can be exposed following finish work (e.g., sanding, polishing, sandblasting, acid etching, acid finishing, or exposed sand grain finishing using a face retarder and power washer) of the treated surface. These visible crystals resemble the appearance of crystals within natural or cut stone.

Adjusting the ratio of the fine aggregate portion to the coarse aggregate portion can enhance the resemblance to natural or cut stone. For example, the appearance of the aesthetically coated surface was found to resemble natural or cut stone when the ratio of the fine aggregate portion to the coarse aggregate portion is about 1:9 to about 5:5, or more preferably about 2:8 to about 4:6. For example, the fine aggregate portion may make up about 10% to about 50%, or about 20% to about 45%, or about 25% to about 40% of the weight of the aggregate component of the aesthetic coating composition, and the remainder may be made up of the coarse aggregate portion. These ratios were found to beneficially balance the different features of the fine and coarse aggregate portions to result in an aesthetic coating composition having good workability, finishability, and resemblance to natural or cut stone.

In some embodiments, the plaster, stucco, or other aesthetic coating composition may further include an adhesive component that promotes adhesion to the lightweight block substrate. The aesthetic coating composition may include an adhesive component in an amount ranging from about 2% to 10%, or about 3% to 9%, or about 4% to 8% of the weight of the composition (excluding water). In a preferred embodiment, the adhesive component is a latex or latex-based adhesive (e.g., polyvinyl acetate, polyvinyl alcohol, and the like), although other embodiments may additionally or alternatively utilize other adhesives such as those based on styrene, acrylonitrile, natural rubber, neoprene, polyurethane, and combinations thereof.

Inclusion of an adhesive component has been found to enhance the internal integrity of the aesthetic coating composition after it cures on the treated substrate surface. Additionally, the adhesive component aids in maintaining a strong bond interface between the aesthetic coating composition and the treated substrate surface so that effective coverage and bonding can occur. It can also minimize sloughing, buckling, or other undesirable artifacts from occurring during application of the aesthetic coating composition, which thereby reduces the occurrence of these artifacts in the finished, cured aesthetic coating layer.

One or more additional components may also be included in the aesthetic coating composition to aid in application and/or to provide desired properties to the finished, cured aesthetic coating layer. For example, one or more dyes or colorants (e.g., white, cream, tan, brown, orange, red, and the like) may be included to provide a desired color scheme to the aesthetic coating and further aid in reproducing the appearance of natural or cut stone. A set retarder used to slow down cement hydration can be included to extend working time of a cementitious plaster or stucco. In addition, or alternatively, a set accelerator may be included. Water reducers and/or other admixtures known in the art can be included. Reinforcing fibers, such as polymer or glass fibers known in the art can be used.

III. System and Method for Manufacture of Modular Blocks

Figure 2:
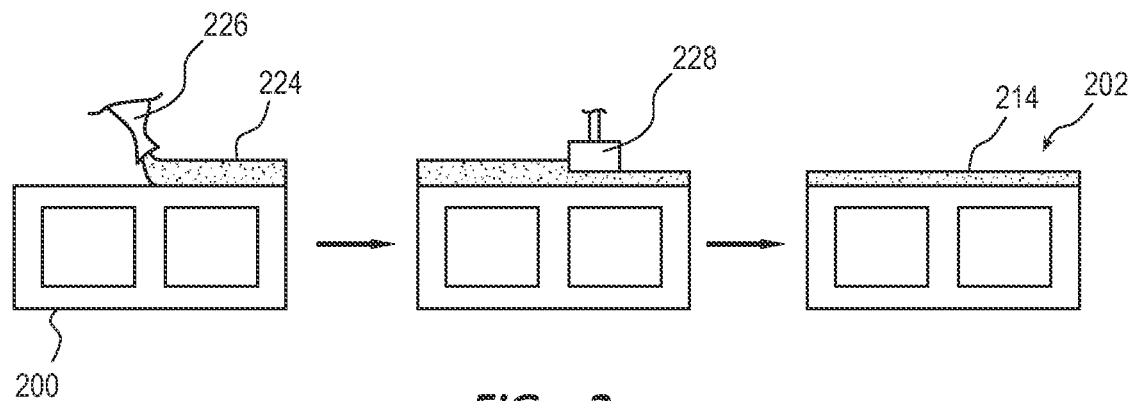
FIGS. 2 through 4 illustrate exemplary manufacturing processes and systems for forming a lightweight block such as shown in FIG. 1.
Figure 3:
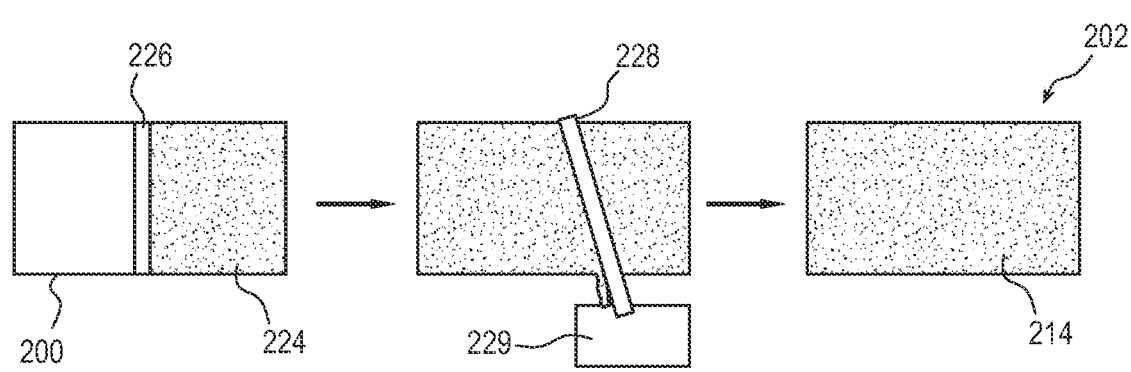

FIGS. 2 and 3 are a side view and a top view, respectively, of an exemplary embodiment of a manufacturing system and related process for manufacturing lightweight blocks similar to lightweight block 100 of FIG. 1. As illustrated, a series of lightweight block substrates 200 are conveyed toward a series of modifying machines. The block substrates 200 may be conveyed using a conveyor belt, a roller conveyor, slide conveyor, or other suitable mechanism for moving the block substrates 200 relative to a series of modifying machines. Additionally, or alternatively, the modifying machines may be configured to move relative to the series of block substrates 200, though typically it will be more straightforward to convey the block substrate 200 relative to stationary machinery. In addition, although the machinery is oriented in the illustrated embodiment to apply an aesthetic coating composition to an upper surface of the block substrate 200, it will be understood that the same mechanisms may be oriented on a side or bottom surface of the block substrate 200.

In a first step, the block substrate 200 first passes an applicator 226, which applies an amount of the aesthetic coating composition 224 to a surface of the block substrate 200 to form an intermediate block 202 having an intermediate aesthetic coating layer 214. The applicator 226 may be formed as a chute, for example. Following application of the aesthetic coating composition, the block substrate 200 is moved toward and past a leveler 228. The leveler 228 may be a blade, bar, edge, roller, or other such structure capable of spreading and/or removing excess plaster from the treated surface of the block substrate 200. The leveler 228 is positioned with a predetermined gap between the treatment surface and the lower extent of the leveler 228. Excess aesthetic coating composition removed by the leveler 228 may be collected in a collection bin 229.

The thickness of the aesthetic coating layer 214 may be set according to design preferences or particular application needs. Typically, effective results are seen with an aesthetic coating layer thickness of about ⅛ inch to ⅜ inch, such as ¼ inch, although thicknesses greater than ⅜ inch or less than ⅛ inch are certainly within the scope of the disclosure. The leveler 228 or other apparatus (not shown) may provide a depression or void on one or more sides of the coated block surface to permit receipt and application of grout to provide aesthetic grout or mortar lines, thereby completing the natural look of cut stone pieces.

Following the leveling step, the intermediate block 202 may be conveyed to a holding area to allow the aesthetic coating layer 214 to harden or cure. The curing time can be for about 12 hours to about 7 days, but usually that passage of about 24 hours provides sufficient hardening so that the lightweight blocks can be handled (although cementitious compositions may continue building strength for weeks or months, especially when exposed to moisture).

Figure 4:
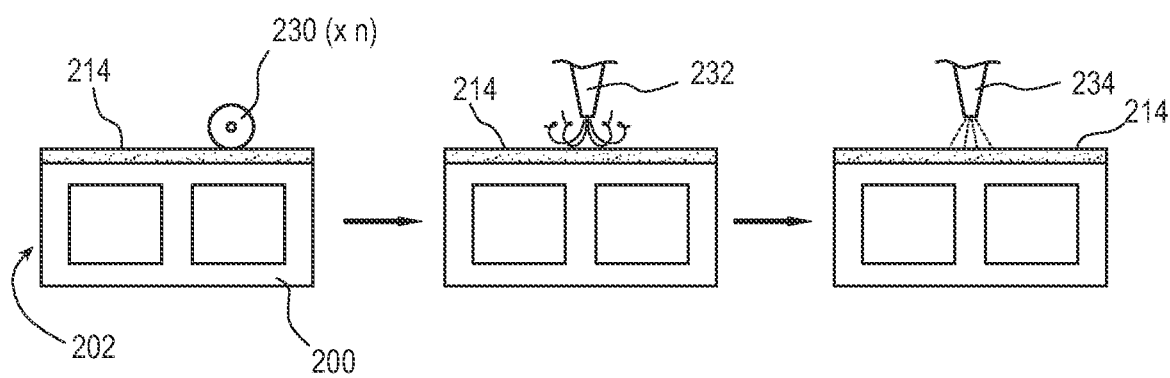

FIG. 4 illustrates additional processing steps that may be carried out on the intermediate block 202 following hardening or curing of the aesthetic coating layer 214. As shown, the intermediate block 202 may be conveyed to one or more finishers 230. The finisher(s) may be one or more sanders (e.g., belt sanders or orbital sanders), grinders, polishing devices, such as a lapping device with a suitable abrasive, sandblasters, applicators for acid etch, acid wash, and/or face retarder, and power washers, for example. The (x n) illustrated in FIG. 4 represents the fact that additional finishers may be included. For example, the intermediate block 202 may first pass through a coarse grade sander followed by one or more progressively finer grade sanders or polishers.

As described above, the beneficial formulation of the aesthetic coating composition 224, in combination with the finishing process, enables the finished surface of the aesthetic coating layer 214 to resemble natural or cut stone. In particular, after passing through the one or more finishers 230, the finished surface of the aesthetic coating layer 214 can include visible crystal facets of appropriate size distributed across the finished surface in a manner that resembles natural or cut stone.

Following finishing of the aesthetic coating surface, the intermediate block 202 may be moved past a cleaner 232. The cleaner 232 may be configured to discharge compressed air, and/or water, and/or other suitable fluid to clean the surface of the aesthetic coating layer 214. Other embodiments may additionally or alternatively utilize one or more brushes or vacuum devices to remove residual dust/debris from the finished surface.

The intermediate block 202 may then be conveyed to a sealer system 234 configured to apply a polymer or other sealer to the finished surface of aesthetic coating layer 214. The sealer system 234 may utilize a sprayer and/or roller brush, for example, to apply the sealant to the finished surface of the aesthetic coating layer 214. Examples of sealers include any sealer suitable for use in sealing concrete, including silanes, siloxanes, siliconates, epoxies, urethanes, acrylic polymers and copolymers, alkali silicates, and integrated sealers.

Figure 11:
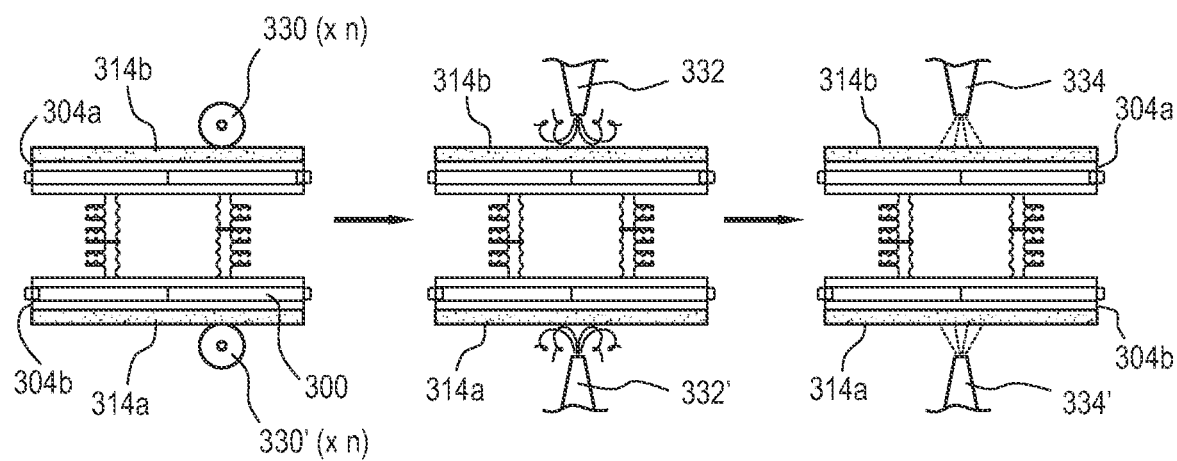
Figure 12A:
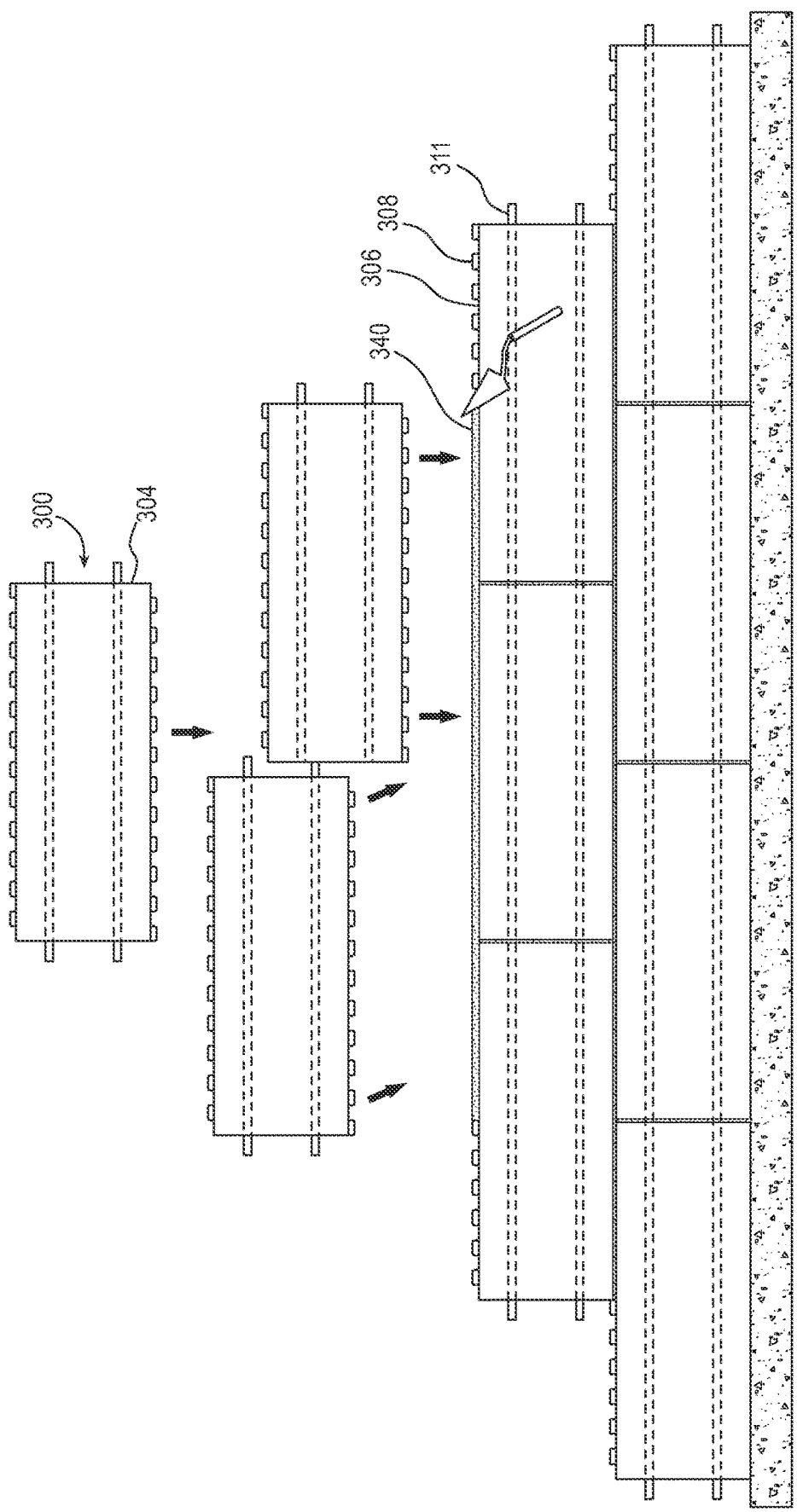
FIGS. 12A and 12B illustrate an exemplary method of forming walls using lightweight blocks.
Figure 12B:
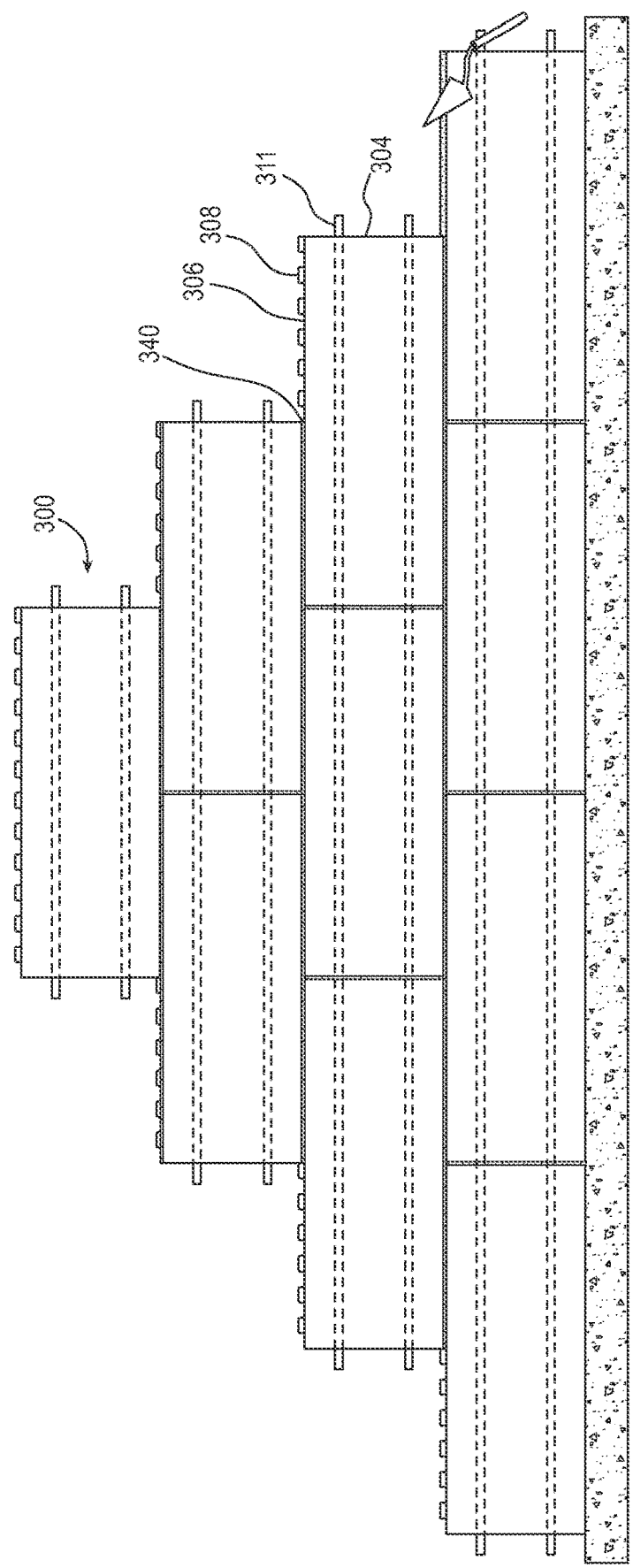
Figure 13A:
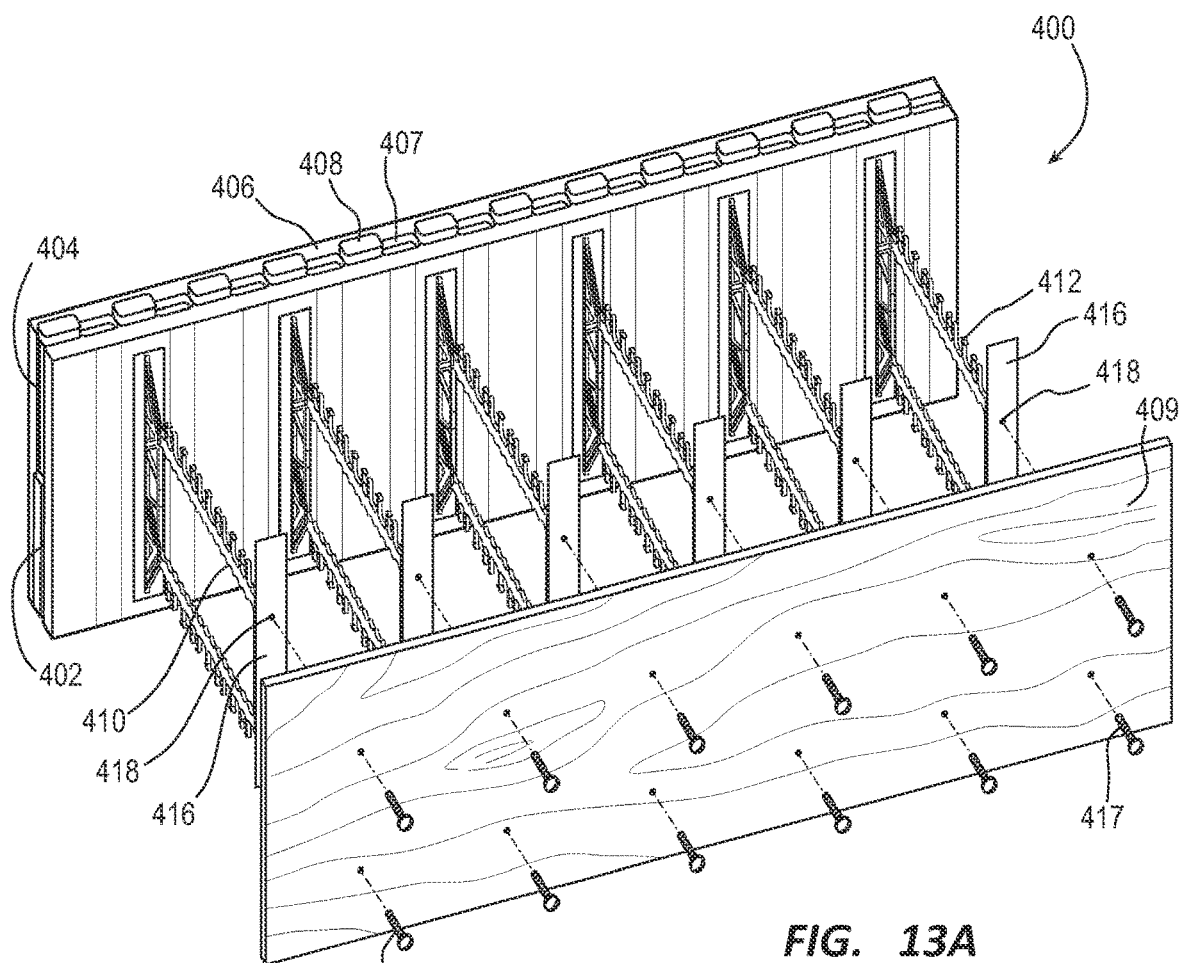
FIGS. 13A and 13B illustrate another exemplary embodiment of a lightweight block in which one side of an ICF block substrate comprises a temporary form layer.
Figure 13B:
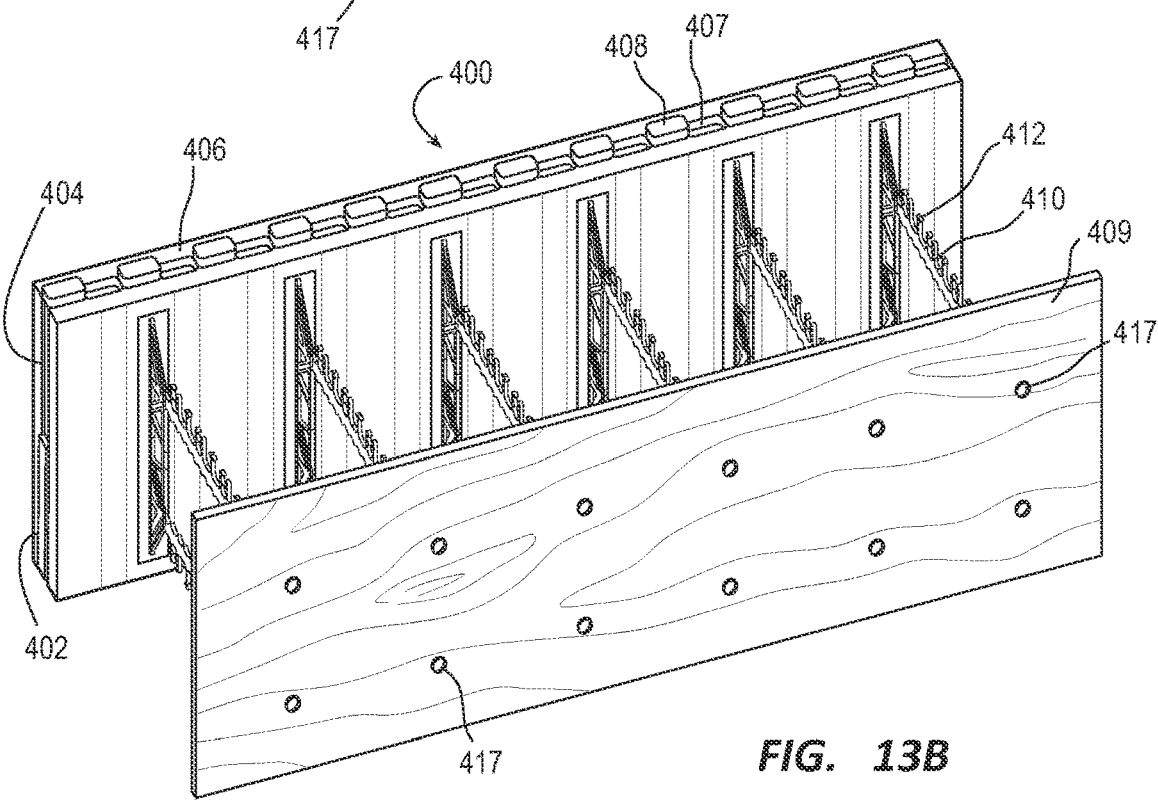
Figure 14:
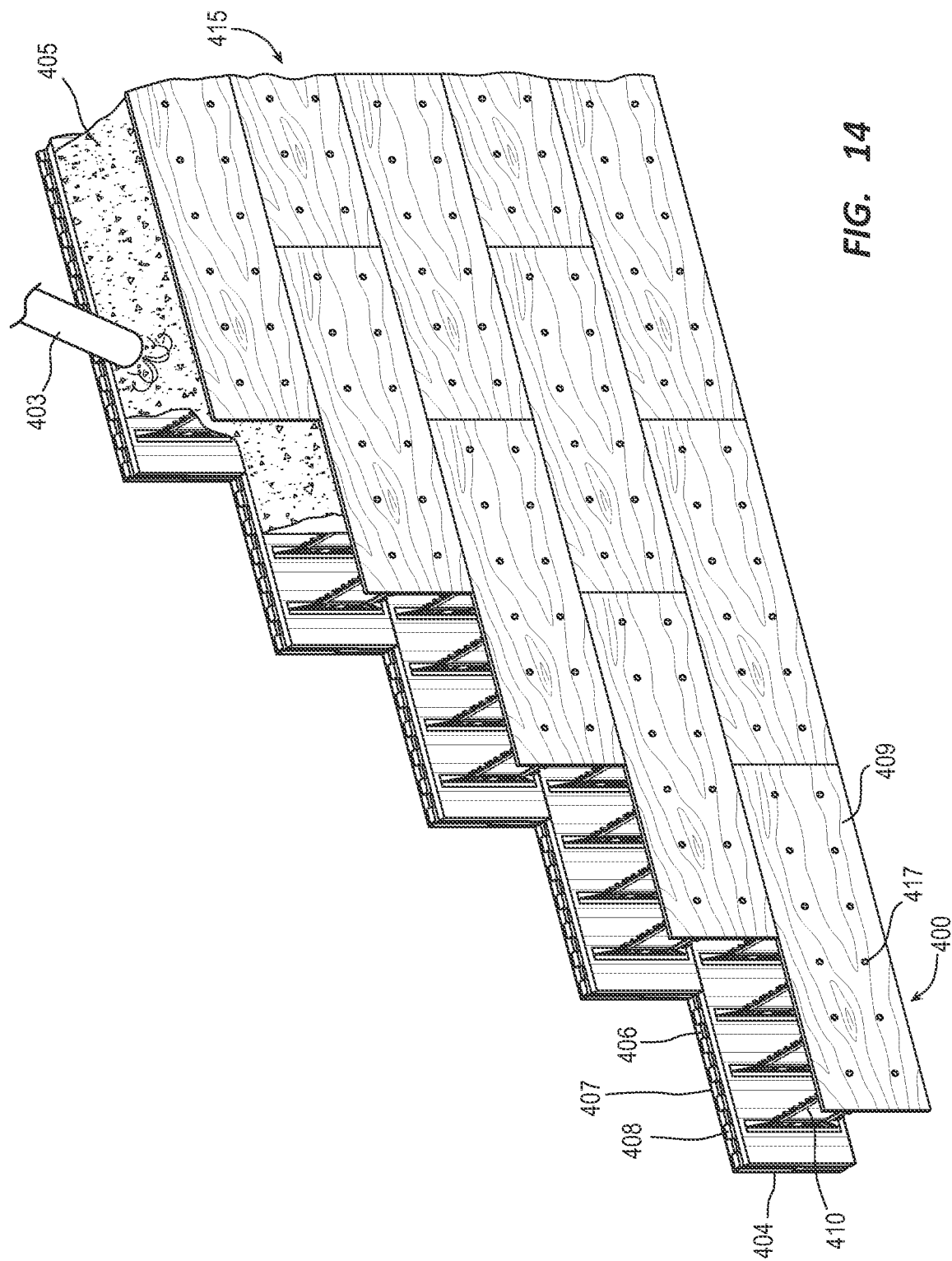
FIG. 14 illustrates an exemplary method of forming a wall using the lightweight block of FIGS. 13A and 13B.

The method of manufacture described above can be applied to the manufacturing of other lightweight blocks, such as insulated concrete form (ICF) 300 of FIGS. 5-12B, and insulated concrete form (ICF) 400 of FIGS. 13A-14. The insulated concrete forms 300, 400 of FIGS. 5-14 comprise at least one side 304, 404, which can comprise a low-density substrate, as discussed above.

Figure 7:
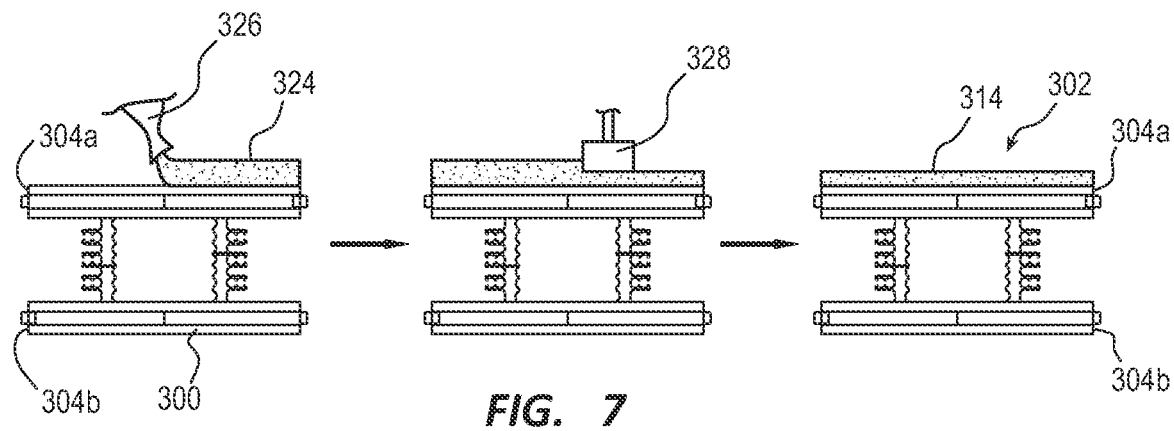
FIGS. 7 through 9 illustrate exemplary manufacturing processes and systems for forming a lightweight block using an ICF as the lightweight block substrate, such as the lightweight block shown in FIGS. 6A and 6B.

In a first step, as illustrated in FIG. 7, the first side 304a of the lightweight block substrate 300 passes an applicator 326, which applies an amount of the plaster, stucco, or other aesthetic coating composition 324 to a surface of the first side 304a to form an intermediate block 302 having an intermediate aesthetic coating layer 314. The applicator 326 may be formed as a chute.

Figure 8:
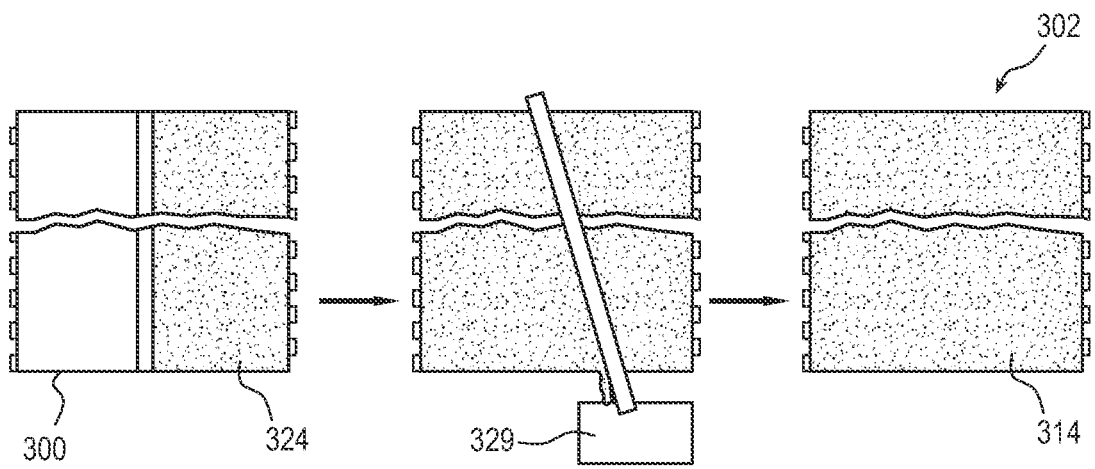

Following application of the aesthetic coating composition 324, the first side 304a of the intermediate block 302 is moved toward and past a leveler 328. The leveler 328 may be a blade, bar, edge, roller, or other such structure capable of spreading and/or removing excess aesthetic coating composition 324 from the treated surface first side 304a. The leveler 328 is positioned with a predetermined gap between the treatment surface and the lower extent of the leveler 328. Excess aesthetic coating composition that is removed by the leveler 328 may be collected in a collection bin 329 (FIG. 8).

The thickness of the aesthetic coating layer 314 may be set according to design preferences or particular application needs. Typically, effective results are seen with a plaster layer thickness of about ⅛ inch to ¾ inch, such as ¼ inch, ⅜ inch, ½ inch, or ⅝ inch, although thicknesses greater than ¾ inch or less than ⅛ inch are certainly within the scope of the disclosure. The leveler 328 or other apparatus (not shown) may provide a depression or void on one or more sides or regions of the coated block surface to permit receipt and application of grout to provide aesthetic grout or mortar lines, thereby completing the natural look of cut stone pieces.

Following the leveling step, the intermediate block 302 may then be conveyed to a holding area to allow the aesthetic coating layer 314 to harden or cure. The curing time period can be for about 12 hours to 7 days, but usually about 24 hours provides sufficient hardening before the coated blocks can be handled (although cementitious compositions may continue building strength for weeks or months, especially when exposed to moisture).

Figure 9:
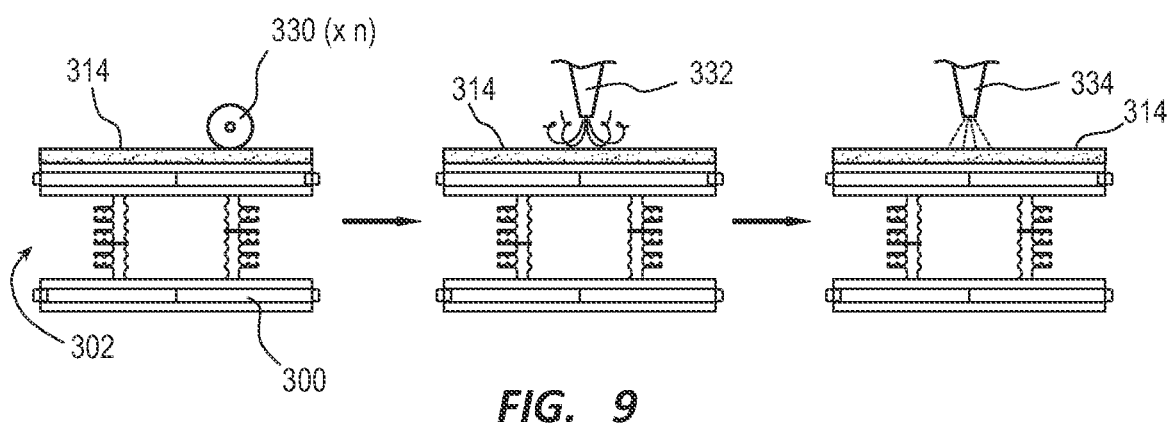

FIG. 9 illustrates additional processing steps that may be carried out on the intermediate block 302 following hardening or curing of the aesthetic coating layer 314. As shown, the intermediate block 302 may be conveyed to one or more finishers 330. The finisher(s) may be sanders (e.g., belt sanders or orbital sanders), grinders, polishing devices, such as a lapping device with a suitable abrasive, sandblasters, applicators for acid etch, acid wash, and/or face retarder, and power washers, for example. The (x n) illustrated in FIG. 9 represents the fact that additional finishers may be included. For example, the intermediate block 302 may first pass through a coarse grade sander followed by one or more progressively finer grade sanders or polishers.

As described above, the beneficial formulation of the aesthetic coating composition 324, in combination with the finishing process, enables the finished surface of the aesthetic coating layer 314 to resemble natural or cut stone. In particular, after passing through the one or more finishers 330, the finished surface of the aesthetic coating layer 314 can include visible crystal facets of appropriate size distributed across the treated surface in a manner that resembles normal or cut stone.

Following the finishing of the aesthetic coating surface, the intermediate block 302 may be moved past a cleaner 332. The cleaner 332 may be configured to discharge compressed air, and/or water, and/or other suitable fluid to clean the surface of the aesthetic coating layer 314. Other embodiments may additionally or alternatively utilize one or more brushes or vacuum devices, for example, to remove residual dust/debris from the finished surface.

The intermediate block 302 may then be conveyed to a sealer system 334 configured to apply a sealant (e.g., integrated sealer) to the finished surface of aesthetic coating layer 314. The sealer 334 may utilize a sprayer and/or roller brush, for example, to apply the sealant to the finished surface of the aesthetic coating layer 314.

Figure 10:
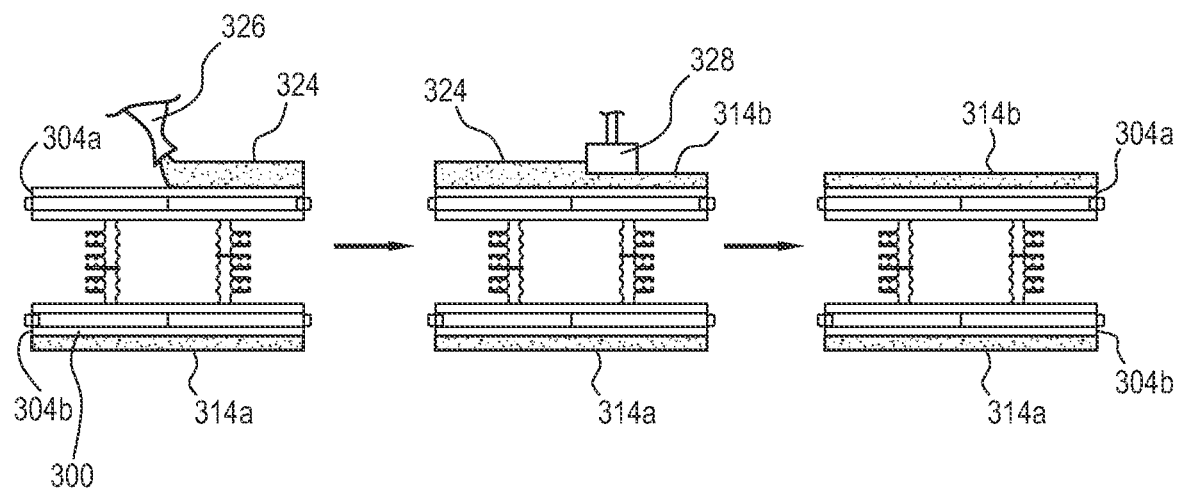
FIGS. 10 through 11 illustrate exemplary manufacturing processes and systems for forming a lightweight block having two coated surfaces using an ICF as the lightweight block substrate.

In some embodiments, the method of manufacture can be applied to a second side 304b of an intermediate block 302, as shown in FIGS. 10-11. Applying an aesthetic coating on both sides of a lightweight block may be preferred when an aesthetic look, such as natural or cut stone, is preferred on both sides of a wall, such as on outdoor retaining walls, garden walls, courtyard walls, or the like. Similar aesthetic finishes may be desired by individuals wishing to have the appearance of natural or cut stone, or other finishes on the interior of finished structures.

FIGS. 12A and 12B illustrate a method of assembling the finished lightweight blocks 300 (also, applicable to modular block 400), wherein the blocks 300 are stacked in a staggered manner, which enhances the structural integrity of the resulting wall. A layer of mortar or grout 340 can be applied to the top surface 306 of a first block 300 before placing another block 300 on top of the first block 300. The grout 340 can then be smoothed to enhance the appearance of the aesthetic coating composition 314 by imparting the appearance of natural or cut stone laid in a traditional manner (i.e. brick and mortar). Aesthetic coating composition 314 can be the same as or similar to the aesthetic coating composition 114.

Turning now to FIGS. 13A and 13B, which illustrate another embodiment of a lightweight modular block 400. The lightweight block 400, as shown, comprises a first side and a second side, where the first side can comprise a side form 404 made of a lightweight material, such as expanded polystyrene, and the second side can comprise a temporary form 409, such as a wooden board. The side form 404 will typically be modified to include an aesthetic coating layer on an exposed surface. The side form 404 can include a series of supports 410 embedded or integrally formed with the side form 404, and the free end 416 of each of the supports of the series of supports 410 can have a receiving feature 418 providing for the connection of a temporary form 409 to the series of supports 410. Fasteners 417 configured to selectively connect to the receiving feature 418 can be used to connect the temporary form 409 to the series of supports 410. The temporary form 409 can comprise wood, or like materials which can be easily removed from cured concrete to yield an exposed concrete surface.

FIG. 14 illustrates an example of a wall 415 comprising lightweight modular blocks 400. Similar to lightweight modular block 300, lightweight modular block 400 comprises a top surface 406a and a bottom surface 406b, which each include a series of alternating depressions 407 and protrusions 408 to facilitate secure stacking of blocks 400. After lightweight modular blocks 400 are stacked in a staggered configuration to form a wall 415, a pump hose 403 can be used to pump concrete 405 to fill the space between the temporary form 409 and the side form 404. Once the concrete 405 has cured, the temporary forms 409 are removed to reveal a concrete surface. Lightweight modular block 400 may be preferred in structures where the wall does not need to be finished on both sides, such as in a parking structure or elevator shaft.

Lightweight modular blocks 100, 300, 400 that are pre-finished with an aesthetic coating layer 114, 314 and manufactured according to the methods described above, can be advantageous for construction. For example, lightweight modular blocks 100 need only be stacked to provide a decorative aesthetic finish and may not require further finishing, except for addition of optional grout or mortar lines. Furthermore, ICFs, which form the block substrate for modular blocks 300, 400, can be shipped flat, thereby significantly reducing shipping costs due to reduced size and weight of materials, and because the lightweight modular blocks 300, 400 are pre-finished, additional purchase or shipment of heavy finishing materials, such as cut stone or brick is not necessary.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A lightweight block adapted to give the appearance of natural or cut stone, comprising:
a lightweight polymeric block substrate formed from a lightweight polymeric material having a density less than 1680 kg/m$^3$; and
an aesthetic coating composition bonded to at least one surface of the lightweight polymeric block substrate to form an aesthetic coating layer,
the aesthetic coating layer being formulated to resemble natural or cut stone,
the aesthetic coating composition comprising:
a binder component selected from a cementitious binder selected from Portland cement, white cement, and supplementary cementitious material (SCM) and a polymer binder selected from an acrylic binder, polyvinyl alcohol binder, alkyd resin binder, and polyurethane binder; and
a limestone and/or silica aggregate component including at least two gradations of aggregate,
wherein the aggregate component comprises a fine sand portion and a coarse sand portion, wherein the fine sand portion has a D90 within a range of about 0.075 mm to 0.425 mm and/or a D50 that is 0.075 mm or less, and wherein the coarse sand portion has a D90 within a range of about 0.425 mm to 2.80 mm.

2. The lightweight block of claim 1, wherein the lightweight polymeric material has a density of less than about 150 kg/m$^3$.

3. The lightweight block of claim 1, wherein the lightweight polymeric block substrate is an insulated concrete form (ICF), which includes:
a first side;
a second side; and
a plurality of supports, connecting the first side to the second side, wherein each support comprises a first fastening end and a second fastening end, the first fastening end being embedded within the first side,
wherein at least the first side comprises a low-density polymeric substrate material having a density less than about 150 kg/m$^3$.

4. The lightweight block of claim 1, the aesthetic coating composition comprising:
a cementitious binder selected from Portland cement, white cement, and supplementary cementitious material (SCM); and
a limestone aggregate component including at least two gradations of limestone aggregate.

5. The lightweight block of claim 4, wherein white cement constitutes about 50% or more of the cementitious binder, the cementitious binder constitutes about 15% to 45% of the dry weight of the aesthetic coating composition, and the aggregate component constitutes about 55% to 85% of the dry weight of the aesthetic coating composition.

6. The lightweight block of claim 4, wherein the limestone aggregate component comprises a fine sand portion and a coarse sand portion, wherein the fine sand portion has a D90 within a range of about 0.105 mm to 0.300 mm.

7. The lightweight block of claim 4, wherein the aesthetic coating composition further comprises a latex adhesive component in an amount ranging from about 2% to 10% of the dry weight of the aesthetic coating composition.

8. A structural wall comprising a plurality of lightweight blocks of claim 3 arranged in a staggered and layered configuration and concrete positioned within one or more interior spaces provided by the lightweight blocks.

9. A lightweight block adapted to give the appearance of natural or cut stone, comprising:
a lightweight block substrate formed from a lightweight material having a density less than 1680 kg/m$^3$; and
an aesthetic coating composition on at least one surface of the lightweight block substrate to form an aesthetic coating layer,
the aesthetic coating layer being formulated to resemble natural or cut stone,
wherein the aesthetic coating composition comprises:
a binder component selected from a cementitious binder selected from Portland cement, white cement, and supplementary cementitious material (SCM) and a polymer binder selected from an acrylic binder, polyvinyl alcohol binder, alkyd resin binder, and polyurethane binder; and
an aggregate component including at least two gradations of limestone aggregate, including a fine limestone sand portion and a coarse limestone sand portion,
wherein the fine limestone sand portion has a D90 within a range of about 0.105 mm to 0.300 mm and the coarse limestone sand portion has a D90 within a range of about 0.425 mm to 2.80 mm.

10. The lightweight block of claim 9, wherein the lightweight material has a density of less than about 750 kg/m$^3$.

11. The lightweight block of claim 9, wherein the lightweight material has a density of less than about 300 kg/m$^3$.

12. The lightweight block of claim 9, wherein the lightweight material has a density of less than about 80 kg/m$^3$.

13. The lightweight block of claim 9, wherein the lightweight block substrate is an insulated concrete form (ICF), which includes:
a first side;
a second side; and
a plurality of supports, connecting the first side to the second side, wherein each support comprises a first fastening end and a second fastening end, the first fastening end being embedded within the first side,
wherein at least the first side comprises a low-density substrate material having a density less than about 150 kg/m$^3$.

14. The lightweight block of claim 13, wherein the first and second sides each comprise a low-density polymer foam.

15. The lightweight block of claim 13, wherein the first side comprises a low-density polymer foam and the second side comprises a removable form.

16. A lightweight block adapted to give the appearance of natural or cut stone, comprising:
an insulated concrete form (ICF) comprised of:
a first side comprising expanded polystyrene;

a second side comprising expanded polystyrene and being entirely spaced-apart from the first side such that the first side and second side do not contact each other; and a plurality of supports, separate from the first side and the second side and connecting the first side to the second side, wherein each support comprises a first fastening end and a second fastening end, wherein the first fastening end is embedded within the first side and the second fastening end is embedded within the second side; and a cementitious coating composition bonded to at least the first side of the ICF that forms an aesthetic coating layer, the cementitious coating composition being formulated to resemble natural or cut stone, wherein the cementitious coating composition comprises a cementitious binder and a limestone and/or silica aggregate, the cementitious binder comprising white cement, wherein the white cement constitutes about 50% or more of the cementitious binder, the cementitious binder constitutes about 15% to 45% of the dry weight of the cementitious coating composition, and the limestone and/or silica aggregate constitutes about 55% to 85% of the dry weight of the cementitious coating composition.

17. The lightweight block of claim 16, wherein the aesthetic coating layer includes at least two gradations of aggregate including a fine sand portion and a coarse sand portion, wherein the fine sand portion has a D90 within a range of about 0.075 mm to 0.425 mm and/or a D50 that is 0.075 mm or less, and wherein the coarse sand portion has a D90 within a range of about 0.425 mm to 2.80 mm.

18. The lightweight block of claim 16, wherein the cementitious coating composition further comprises a latex adhesive component in an amount ranging from about 2% to 10% of the dry weight of the cementitious coating composition, wherein the latex adhesive component promotes adhesion of the cementitious coating composition to the expanded polystyrene of the ICF.

19. A lightweight block adapted to give the appearance of natural or cut stone, comprising:
   an insulated concrete form (ICF) comprised of:
      a first side comprising expanded polystyrene;
      a second side comprising expanded polystyrene and being entirely spaced-apart from the first side such that the first side and second side do not contact each other; and
      a plurality of supports, separate from the first side and the second side and connecting the first side to the second side, wherein each support comprises a first fastening end and a second fastening end, wherein the first fastening end is embedded within the first side and the second fastening end is embedded within the second side; and
   a cementitious coating composition bonded to at least the first side of the ICF that forms an aesthetic coating layer,
   the cementitious coating composition being formulated to resemble natural or cut stone, wherein the cementitious coating composition comprises a cementitious binder, a limestone and/or silica aggregate, and a latex adhesive component in an amount ranging from about 2% to 10% of the dry weight of the cementitious coating composition, the cementitious binder comprising white cement.

20. The lightweight block of claim 19, wherein the latex adhesive component promotes adhesion of the cementitious coating composition to the expanded polystyrene of the ICF.

\* \* \* \* \*